June 21, 1966     R. S. WILKES     3,256,972
ADJUSTABLE LIVESTOCK FEEDER
Filed Sept. 22, 1964
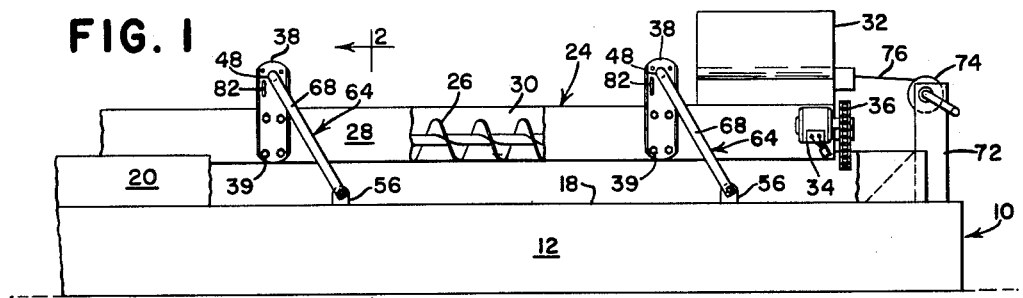
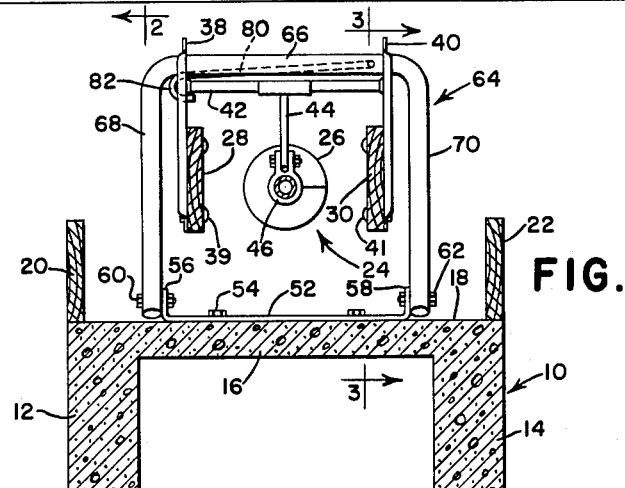
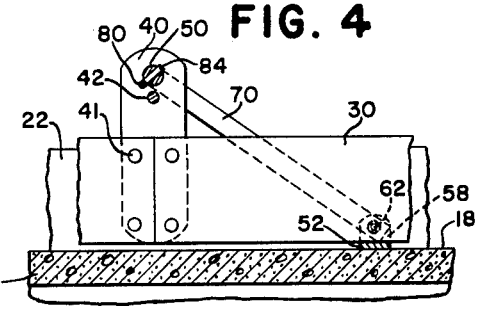
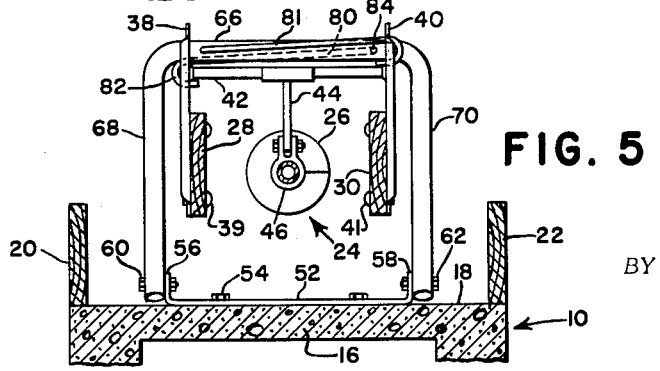
INVENTOR.
RAYMOND S. WILKES
BY
John M Nolan
ATTORNEY

United States Patent Office 3,256,972
Patented June 21, 1966

3,256,972
ADJUSTABLE LIVESTOCK FEEDER
Raymond S. Wilkes, Moline, Ill., assignor to Deere & Company, Moline, Ill., a corporation of Delaware
Filed Sept. 22, 1964, Ser. No. 398,239
19 Claims. (Cl. 198—64)

This invention relates to a material conveying and distributing device and more particularly to a vertically adjustable suspension device for a conveyor used in a livestock feeder, including spring means to facilitate the raising of the conveyor.

A conventional livestock feeder includes an elongated bunk and a longitudinal conveyor to move the feed from a hopper at one end of the bunk and distribute it along both sides of the bunk. One type of conveyor, as described in copending U.S. patent application Ser. No. 343,784, filed February 10, 1964, includes an auger disposed between upright retaining walls. In operation it is desirable to have such a conveyor vertically adjustable relative to the bunk floor with the retaining walls initially resting on or closely adjacent the bunk floor. This permits the feed to build up between the walls along the entire length of the bunk. The conveyor is then raised in increments to allow successive layers of the feed to build up and also to allow the feed to move under the retaining walls for accessibility to the livestock. When the conveyor is raised by a manually powered device, which is generally the case, it is also desirable that means be provided to aid in the lifting of the conveyor, since the auger, hopper, and retaining walls are relatively heavy, especially in larger installations.

Accordingly, it is proposed in the copending U.S. application that the conveyor be suspended on longitudinally spaced arms having one end pivotally connected to the retaining walls and the other end rockable about a second horizontal pivot on the bunk floor, longitudinally offset from the first pivot, so that the conveyor will move in a longitudinal vertical arc in response to a longitudinal force applied to the conveyor. A helical compression spring is positioned between the floor and each support arm to facilitate the raising of the conveyor. However, the helical compression spring may interfere with the movement of the feed or become clogged with feed. In addition, such a spring is necessarily quite large and stiff to supply sufficient force to substantially aid in the raising of the conveyor.

The present invention is an improvement in the suspension of the conveyor device above the floor of the feed bunk, including improved spring means to aid the lifting of the conveyor.

Accordingly, an object of the present invention is to provide improved suspension means for supporting a conveyor above a livestock feed bunk for vertical adjustment of the conveyor relative to the bunk floor.

Another object is to provide improved spring means for partially overcoming the weight of the conveyor and for facilitating the raising of the conveyor.

Another object is to provide such spring means in the form of a torsion bar which will not interfere with the movement of the feed.

Still another object is to provide such suspension means and spring means which are of simple and rugged construction, inexpensive and easy to manufacture and maintain.

These and other objects and advantages of the invention will become apparent from the accompanying drawings and following description wherein an embodiment of the invention is described.

In the drawings:

FIG. 1 is a front elevation view of the hopper end portion of the livestock feeder, with portions of the side boards and retaining walls removed.

FIG. 2 is an enlarged section view taken along the line 2—2 of FIG. 1.

FIG. 3 is a sectional view taken along the line 3—3 of FIG. 2, showing the retaining wall in a raised position.

FIG. 4 is the same view as FIG. 3 showing the retaining wall in a lowered position.

FIG. 5 is a sectional view similar to FIG. 2, but showing a modified form of the invention.

Referring now to the drawings, there is shown an elongated feed bunk 10 comprising opposite upright side walls 12 and 14 which support a horizontal table portion 16 at their upper ends, the top surface of the table portion forming a material receiving floor 18 of the bunk. The bunk is preferably made of concrete, although other materials may readily be used. Opposite side boards 20 and 22 extend vertically from the longitudinal edge of the floor 18, and form, in conjunction with the floor, a trough which retains the feed.

A conveyor assembly, indicated generally by the numeral 24, extends the length of the bunk and includes an auger 26 longitudinally disposed between opposite upright retaining walls 28 and 30 extending the length of the bunk. A hopper 32 is supported by the retaining walls at the intake end of the auger. A motor 34 is also supported by the retaining walls and drives the auger through a drive means 36.

A plurality of longitudinally spaced plates 38 are attached to the outer surfaces of the retaining wall 28 by means of fasteners 39 and extend vertically above the upper edges of the retaining wall. Similarly, a plurality of plates 40 are attached to the outer surface of the retaining wall 30 by means of fasteners 41 and also extend vertically above the upper edge of the retaining wall, a plate 40 being transversely opposite each plate 38. The plates 38 and 40 have transverse horizontal coaxial bores 48 and 50 through their respective vertically extending portions. A horizontal support member 42 is fixed between each pair of opposed plates above the retaining walls and below the bores 48 and 50. A vertical suspension member 44 depends from each horizontal support member and carries a journal 46 at its lower end, the auger 26 being rotatably mounted in the journals 46.

A plurality of transverse longitudinally spaced brackets 52 are attached to the floor 18 by means of fasteners 54. The brackets are spaced at the same intervals as the plates 38 and 40, and are longitudinally offset from the axis of the bores 48 and 50 toward the intake end of the auger. Tabs 56 and 58 project upwardly from the opposite ends of each bracket. The tabs 56 and 58 carry transverse horizontal coaxial pivots 60 and 62 respectively.

An inverted U-shaped support member 64, having a horizontal bight portion 66 between parallel leg portions 68 and 70, is rockably mounted to each bracket, the ends of the leg portions 68 and 70 being mounted to pivots 60 and 62 respectively. The horizontal bight portion 66 is journaled in the bores 48 and 50.

An end support 72 extends vertically from the hopper end of the bunk and carries winch means 74, including a cable 76. The end of the cable is attached to the hopper 32.

By rotating the winch, a longitudinal force toward the hopper end of the bunk is exerted on the conveyor assembly 24 carried by the support members 64. The support members swing in a longitudinal vertical arc about the pivots 60 and 62 in response to the longitudinal force, the conveyor assembly raising in said arc between the position shown in FIG. 3 and the position shown in FIG. 4.

A plurality of torsion biasing means in the form of torsion bars 80, each bar having one end affixed to a plate 38, extend approximately parallel to the bight portions 66 of the support members 64. The other end of each bar is affixed to said bight portions a realtively short distance inside the plates 40. Each torsion bar is affixed to the plate 38 by means of a U-shaped hook portion 82 at one end of the bar, the opposite legs of the U-shaped portion being inserted through adjacent bores in the plate 38. The other end of each bar has a 90° bend, the bent portion 84 being inserted through a transverse bore in the bight portion 66, thereby attaching the bar to the bight portion.

When the conveyor is in a raised position, as shown in FIG. 3, the bar is not stressed. However, when the conveyor gravitates to the position shown in FIG. 4, the bight portion 66 rotates to the same extent the support member 64 rotates about the pivots 60 and 62, the bent portion 84 of each torsion bar 80 acting as a lever arm to twist one end of each bar relative to the opposite end affixed to the plate 38. The weight of the conveyor is sufficient to twist the torsion bars to a degree allowing the retaining walls to seat on the floor 18. However, the torsion in the bars exerts a substantial force on the support members 64 and the plates 38, counteracting the weight of the conveyor and urging the conveyor toward a raised position. Thus, the conveyor is lowered by the force of gravity to seat on the bunk floor 18 for the initial buildup of the feed, the descent being controlled by the winch means 74. After the feed has built up, the conveyor is raised in increments by means of the winch means, the raising being aided by the force exerted by the torsion bars.

A modified form of the invention, shown in FIG. 5, is identical to the invention shown in FIGS. 1–4 except that a second torsion bar 81 is added on the opposite side of each bight portion 66 from the torsion bar 80, the second torsion bar also being affixed to the opposite plate from torsion bar 80. Each torsion bar 81 is similarly affixed to a plate 40 by means of a U-shaped hook portion 83, and similarly affixed to the support member 64 by means of a bent portion 85 inserted through the bight portion 66. The added torsion bars deflect as the conveyor is lowered, urging the conveyor toward a raised position. The use of the added torsion bars permits the use of substantially smaller individual torsion bars to obtain the desired counterbalance.

Other features and advantages of the present invention will occur to those skilled in the art, as will many modifications and alterations of the preferred embodiment of the invention as described herein, all of which may be achieved without departing from the spirit and scope of the invention.

What is claimed is:

1. In a material distributing device of the type having a relatively shiftable structure including a longitudinally extending floor and a longitudinally extending conveyor assembly suspended above the floor, and vertically swingable support members having their lower ends pivotally mounted on the floor and carrying the conveyor assembly, and suspension control means operatively connected to the support members for selectively raising or lowering the conveyor assembly, means for partially counterbalancing the gravitational effect of said conveyor comprising a torsion spring means having one end connected to said relatively shiftable structure and the other end affixed to a support member whereby twisting thereof will occur about its axis in response to pivotal movement of said support member.

2. The invention defined in claim 1 wherein the torsion spring means has its relatively shiftable structure end connected to said conveyor assembly, the torsion spring means twisting under the weight of the conveyor assembly to allow the conveyor assembly to seat proximate said floor, exerting a substantial upward force on the conveyor assembly.

3. The invention defined in claim 2 wherein the torsion spring means comprising a plurality of torsion bars, each bar having one end connected to said conveyor assembly and its other end affixed to a support member.

4. In a material distributing device of the type having a longitudinally extending floor, a longitudinally extending conveyor assembly disposed above the floor, means for suspending the conveyor assembly above the floor including a plurality of longitudinally spaced inverted U-shaped support members having a horizontal bight portion and having depending leg portions on opposite sides of the conveyor assembly pivotally mounted at their lower ends to said floor for movement of said support members in longitudinal vertical arcs about the pivots, the conveyor assembly swingably depending from said horizontal bight portions, each pivot being longitudinally offset from the horizontal bight portion for raising or lowering the conveyor assembly in a longitudinal vertical arc in response to longitudinal movement of said conveyor assembly, and suspension control means for selectively raising or lowering the conveyor assembly, the combination therewith of means for partially counterbalancing the weight of said conveyor assembly comprising a plurality of torsion bars, each torsion bar having one end affixed to the horizontal bight portion of a support member for twisting about its axis in response to the pivotal movement of the support member about said pivots, and having the opposite end affixed to a plate means of the conveyor assembly rotationally immobile about its axis, the support member end twisting about its axis relative to the conveyor assembly end under the weight of the conveyor assembly to allow the conveyor assembly to seat proximate the floor, the torsion bars exerting a substantial force tending to raise the conveyor assembly.

5. In a material distributing device of the type having a longitudinally extending floor, a longitudinally extending conveyor suspended above the floor including an auger suspended between opposite upright longitudinally extending retaining walls which have a plurality of plates, longitudinally spaced in opposed pairs, extending upwardly from said walls, the upper portions of each pair of plates having a horizontal transverse coaxial bore, suspension means for the conveyor including a plurality of longitudinally spaced inverted U-shaped support members each member having a horizontal bight portion and having depending leg portions on opposite sides of the conveyor pivotally mounted at their lower ends to said floor for movement of said support members in longitudinal vertical arcs about their pivots, each horizontal bight portion being pivotally mounted in the bores of a pair of said plates, each pair of floor pivots being longitudinally offset from the horizontal bight portion for raising or lowering the conveyor in a longitudinal vertical arc in response to longitudinal movement of the conveyor, and suspension control means for selectively raising or lowering the conveyor, the combination therewith of means for partially overcoming the weight of said conveyor comprising a plurality of torsion bars, each bar having one end affixed to the horizontal bight portion of a support member and the other end affixed to a plate mounted on said support member.

6. The invention defined in claim 5 wherein the end of each torsion bar affixed to the support member twists about its axis relative to the end of the bar affixed to the plate under the weight of the conveyor as it is lowered to the floor, the torsion bars exerting a force tending to raise the conveyor, less than the gravitational effect of the conveyor.

7. The invention defined in claim 6 wherein each torsion bar is affixed to the plate adjacent to the horizontal bight portion of a support member and extends approximately parallel to said bight portion toward the opposite plate, terminating in a 90° bend, the bent portion being transversely affixed to said bight portion between said plates.

8. The invention defined in claim 7 wherein said torsion bars are mounted in pairs to said support members, one bar being affixed to one plate longitudinally spaced to one side of the bight portion of the support member and the other bar being affixed to the opposite plate and spaced on the other side of said support.

9. A material distributing device comprising a longitudinally extending supporting structure including a floor, a plurality of vertically swingable support members having their lower ends pivotally mounted on the floor, a longitudinally extending conveyor assembly suspended above the floor on said support members, suspension control means operatively connected to the support members for raising or lowering the conveyor assembly, and a plurality of torsion bars, each bar having one end connected to said conveyor assembly and rotationally immobile about its axis and the other end affixed to a support member whereby twisting thereof will occur about its axis in response to pivotal movement of said support member.

10. A material distributing device comprising a longitudinally extending supporting structure including a floor, a plurality of horizontal pivots longitudinally spaced in coaxial pairs on said floor, an inverted U-shaped support member with a horizontal bight portion, having opposite ends rockably mounted on each pair of pivots, the support member being swingable in a longitudinal vertical arc, a pair of transversely spaced, opposed plates depending from each horizontal bight portion, swingable in a longitudinal vertical arc, a pair of upright, opposed, longitudinally extending retaining walls carried by the lower portions of said opposed plates, a horizontal support member extending between each pair of plates above said retaining walls, a vertical suspension member depending from each horizontal member and carrying a journal at its lower end, a longitudinally extending auger disposed between said retaining walls rotatably mounted in said journals, an auger feeding hopper carried by said retaining walls at the intake end of said auger, means for driving said auger, suspension control means exerting a longitudinal force on the assembled auger, retaining walls, and hopper, causing them to raise in a longitudinal vertical arc around said horizontal pivots, the bight portion of said U-shaped support member being longitudinally offset from said pivots, and means for partially counterbalancing the gravitational effect of the auger, retaining walls, and hopper.

11. The invention defined in claim 10 wherein the counterbalancing means comprises a plurality of torsion bars which are torsionally stressed as the support members rock about their pivots under the weight of the auger, retaining walls, and hopper, to allow the retaining walls to seat proximate said floor, said stressed torsion bars exerting an upward force on said support members slightly less than the gravitational force of said auger, retaining walls, and hopper.

12. The invention defined in claim 11 wherein each torsion bar has one end affixed to the bight portion of a U-shaped support member and the other end affixed to a plate depending from said support member.

13. The invention defined in claim 12 wherein each torsion bar is affixed to the plate adjacent to the horizontal bight portion of a support member and extends approximately parallel to said bight portion toward the opposite plate, terminating in a 90° bend, the bent portion being transversely fixed to said bight portion between said plates.

14. The invention defined in claim 13 wherein said torsion bars are mounted in pairs to said support members, one bar being affixed to one plate and longitudinally spaced to one side of the bight portion of the support member and the other bar being affixed to the opposite plate and spaced on the other side of said support member.

15. The invention defined in claim 12 wherein said suspension control means includes a support extending vertically from the hopper end of the supporting structure and winch means carried by said support including a cable attached to the assembled auger, retaining walls and hopper, said horizontal pivots being longitudinally offset from the horizontal bight portion of the support members toward said winch means.

16. A material distributing device comprising a longitudinally extending supporting structure, a plurality of vertically swingable support members pivotally mounted on the structure, a longitudinally extending conveyor assembly pivotally suspended on said support members, said supporting structure and conveyor assembly defining a relatively shiftable structure, suspension control means operatively connected to the support members for vertically swinging the control members to thereby raise and lower the conveyor assembly, and torsion biasing means between the relatively shiftable structure and support members counteracting the gravitation of the conveyor assembly.

17. The invention defined in claim 16 in which the conveyor assembly is pivotally suspended from the support members by horizontal pivots, and the biasing means are torsion bars affixed at separated portions to the support members and conveyor assembly respectively and effective to resist pivoting about the pivots.

18. The invention defined in claim 16 in which the suspension control means is effective to move the conveyor assembly between a first position closely adjacent a horizontally disposed material receiving surface underlying the conveyor assembly and a second position spaced vertically above the surface at a predetermined height, and the biasing means is responsive to become effective upon the conveyor assembly being offset downwardly from the second position.

19. The invention defined in claim 18 and further characterized by the biasing means being increasingly effective in proportion to the amount of downward offset from the second position.

References Cited by the Examiner

UNITED STATES PATENTS

| | | | |
|---|---|---|---|
| 2,926,772 | 3/1960 | Reed | 198—213 |
| 3,112,732 | 12/1963 | Carson | 119—52 |

SAMUEL KOREN, *Primary Examiner.*

HUGH R. CHAMBLEE, *Examiner.*